United States Patent [19]
Wakamatsu et al.

[11] 3,986,093
[45] Oct. 12, 1976

[54] PASSIVE SEATBELT SYSTEM

[75] Inventors: Hisato Wakamatsu; Toshihiro Kamiya, both of Toyota; Tomohisa Yoshimi, Gamagori; Hiroshi Arai, Toyota, all of Japan

[73] Assignees: Nippon Soken, Inc., Nishio; Toyota Jidosha Kogyo Kabushiki Kaisha, Toyota, both of Japan

[22] Filed: July 26, 1974

[21] Appl. No.: 492,203

[30] Foreign Application Priority Data

July 28, 1973  Japan............................... 48-85129

[52] U.S. Cl................................ 318/484; 280/744; 180/82 C; 307/10 SB; 297/385; 318/467
[51] Int. Cl.²......................................... B60R 21/02
[58] Field of Search..................... 318/484, 452–454, 318/467; 180/82 C; 280/150 SB; 340/52 E, 278; 307/10 SB; 297/385

[56] References Cited
UNITED STATES PATENTS

| | | | |
|---|---|---|---|
| 3,653,714 | 4/1972 | Gentile............................ | 280/150 SB |
| 3,742,448 | 6/1973 | Motz.................................. | 340/278 |
| 3,757,293 | 9/1973 | Petersen............................ | 340/52 E |
| 3,781,061 | 12/1973 | Walz et al........................ | 180/82 C |
| 3,794,135 | 2/1974 | Ewert et al....................... | 180/82 C |
| 3,836,955 | 9/1974 | Cracraft et al................... | 340/52 E |
| 3,842,929 | 10/1974 | Wada et al....................... | 180/82 C |

*Primary Examiner*—Robert K. Schaefer
*Assistant Examiner*—John J. Feldhaus
*Attorney, Agent, or Firm*—Cushman, Darby & Cushman

[57] ABSTRACT

There is provided a passive seatbelt system which is actuated by an electric motor. The seatbelt system comprises command switch means for generating seatbelt activation and deactivation signals, switch means for detecting the position of a seatbelt, and a control circuit for controlling the motor. The control circuit further comprises a driving circuit for driving the motor and a computing circuit for controlling the driving circuit in accordance with the output signals of the two switch means. The driving and computing circuits included in the control circuit are constructed using hybrid integrated circuits (IC) and the thus miniaturized control circuit can be made integral with the electric motor.

6 Claims, 6 Drawing Figures

PASSIVE SEATBELT SYSTEM

BACKGROUND OF THE INVENTION

1. Field of the Invention

The present invention relates to a passive seatbelt system. In particular, it relates to a control circuit for a passive seatbelt system in which the conditions for the operation of the system are predetermined in accordance with the opening and closing of the door of a vehicle and whether or not the occupant is sitting in the seat of the vehicle, and a seatbelt is fastened around the occupant automatically by means of an electric motor.

2. Description of the Prior Art

In known systems of this type, it has been the practice to control the operation of the system by operating an electric motor in the forward and backward directions. This control method employs an electromagnetic relay and predetermined position detecting switches to directly switch on and off the driving current to the motor. The system of the above type has the following disadvantages. Firstly, since wires which have a current capacity required for driving the motor are employed in the wiring of seatbelt stopping position detecting limit switches, the occurrence of a short-circuit fault has the danger of causing a fire due to the large current capacity, and moreover the noise due to the operation of the electromagnetic relay is sensually offending. Further, while various measures have been attempted to overcome the problem of inertia of the moving parts including the motor which has heretofore been encountered in the designing of an automatic stopping mechanism used under conditions where the range of working temperature is wide and the voltage variation is great, they are all mechanical means so that their functions will be deteriorated by wear and it is not infrequent that these mechanical means are caused to vibrate by the chattering of seatbelt stopping position detecting limit switches. Further, since the control electromagnetic relay is mounted at a position different from that of a driving mechanism, a trouble is caused frequently about the wiring between the electromagnetic relay and the driving mechanism. Furthermore, the system is often housed in the door portion and therefore the electromagnetic relay is caused to operate erroneously by the shock due to the opening and closing of the door, thus giving rise to malfunctions of the system.

SUMMARY OF THE INVENTION

With a view to overcoming the foregoing difficulty, it is an object of the present invention to provide a passive seatbelt system wherein a control circuit section which receives as its input signals the output signals of seatbelt activation command switches and seatbelt position detecting switches and which comprises a driving circuit for supplying a motor driving current and a computing circuit for controlling the operation of the driving circuit in accordance with the switch signals, and wherein the thus miniaturized control circuit section is incorporated in an electric motor whereby to considerably reduce the length and number of the large current capacity wires required for the wiring thereof, thus eliminating the danger of fire due to the short-circuiting of the wiring for the stopping position detecting switches, etc. and the occurrence of noise due to the use of a electromagnetic relay which have heretofore been encountered in the conventional systems and thereby ensuring positive operation of the motor.

It is another object of the present invention to provide such passive seatbelt system wherein the computing circuit is further provided with a circuit for interrupting the supply of current to the motor when the supply voltage exceeds a predetermined value or when the current is supplied to the motor in excess of a predetermined time, a feedback circuit whereby when a seatbelt activation signal and a seatbelt deactivation signal are simultaneously generated either one of the signals is given priority to the other, or pulse-like signal processing circuits for preventing the chattering of the seatbelt position detecting switches, thereby preventing the burning of the motor due to a fire to protect the control circuit itself and preventing the chattering of the switches.

DESCRIPTION OF THE PREFERRED EMBODIMENT

The present invention will now be described in greater detail with reference to the illustrated embodiment.

Figure 1:
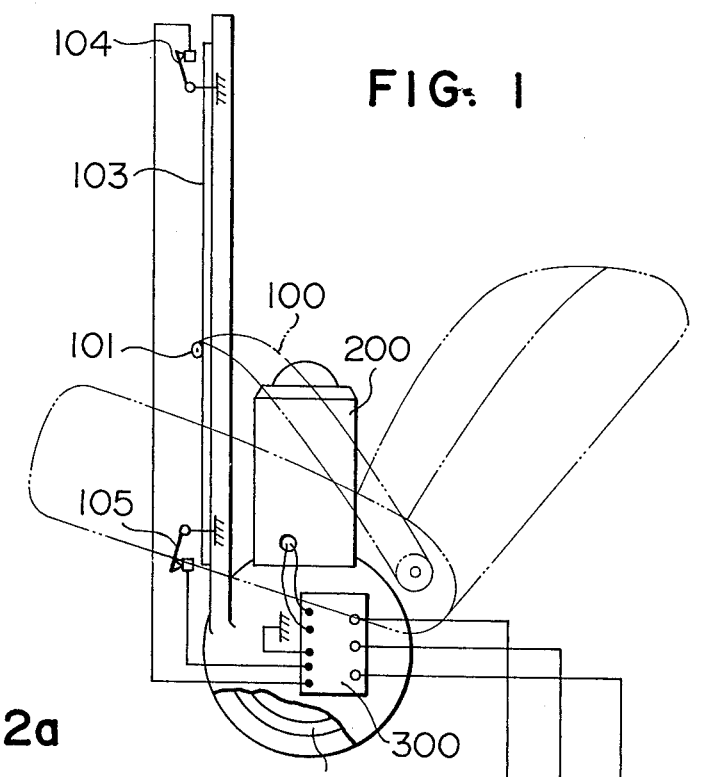
FIG. 1 is a schematic view showing an embodiment of a passive seatbelt system according to the present invention.

Referring first to FIG. 1 showing an embodiment of the invention, numeral 100 designates a seatbelt. Numerals 101 through 105 designate a seatbelt operating mechanism with numeral 101 designating a belt moving piece which is moved along a rail 103 by a wire 102 in accordance with the rotation of an electric motor 200. Numerals 104 and 105 designate seatbelt position detecting limit switches of the normally closed contact type which are turned off when they are in contact with the seatbelt moving piece 101 and which are turned on when they are not in contact with the seatbelt moving piece 101. Each of the switches 104 and 105 has its one end connected to the structural member to accomplish the body grounding. The motor 200 is of the two-terminal type in which the permanent magnets are employed to provide a magnetic field, and the direction of rotation of the motor is changed by changing the polarity of the inputs to the two-terminals. Numeral 300 designates a control circuit. The input signals to the control circuit 300 are supplied from the seatbelt position detecting limit switches 104 and 105 as well as a seat switch 400 and a door switch 500 which constitute seatbelt activation command switches. The seat switch 400 is turned on when the occupant is sitting in the seat and it is turned off when nobody is sitting in the seat. The door switch 500 is designed so that it is turned on when the door is opened, while it is turned off when the door is closed. One end of the lead wire connected to each of the switches 104, 105, 400 and 500 is grounded through the body portion, and these switched are connected to the control circiut 300 by a total of four wires. The other end of the single supply line is grounded through the body portion. The control circuit 300 has only two output terminals for supplying the motor 200. Numeral 600 designates a power source.

With the construction described above, when a person is about to get into the vehicle at rest, the seatbelt moving piece 101 is stationary at the position of the up limit switch 104. When the occupant sits in the seat and the door is closed, the motor 200 comes into operation and the piece 101 is moved to the position of the down limit switch 105 to fasten the seatbelt around the occupant. Then, as the door is opened by the occupant to get out of the vehicle, the piece 101 is returned to the position of the up limit switch 104 and thus the seatbelt is unfastened. In this case, when the door is closed again, the piece 101 is not moved at all and it remains at the position of the up limit switch 104 until the occupant sits in the seat and the door is clsoed.

Figure 2A:
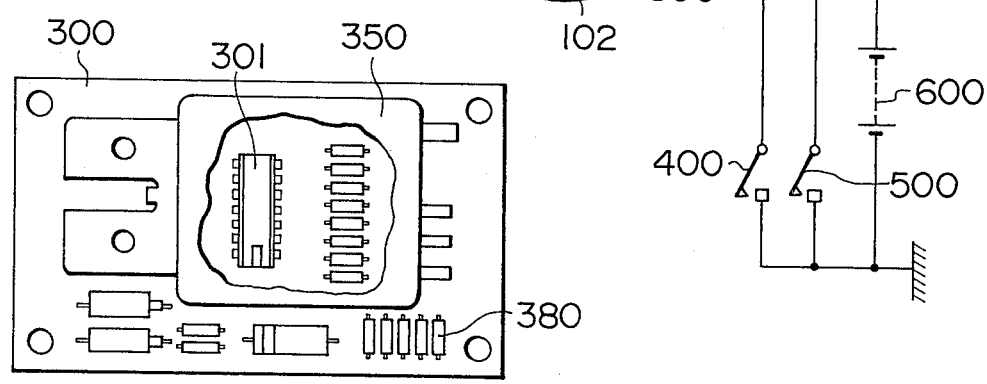
FIG. 2 is an external view of the control circuit section in the embodiment of FIG. 1, with FIG. 2a showing its plan view and FIG. 2b showing its front view.
Figure 2B:
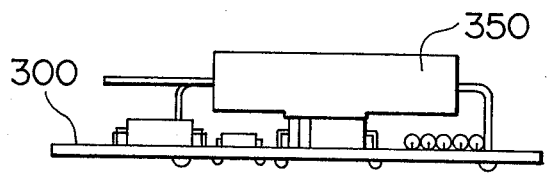

The above-described control is accomplished by the control circuit 300 which will now be described in greater detail with reference to FIGS. 2 through 5. FIGS. 2a and 2b show respectively a plan view and a front view illustrating the external view of the control circuit 300. The control circuit 300 is composed of a C-MOS structure monolithic integrated circuit 301 (hereinafter referred to as a C-MOSIC), a bipolar structure hybrid IC 350 for supplying a motor driving current and a component element group 380 mounted on a printed board for interconnecting the IC's 301 and 350.

Figure 3:
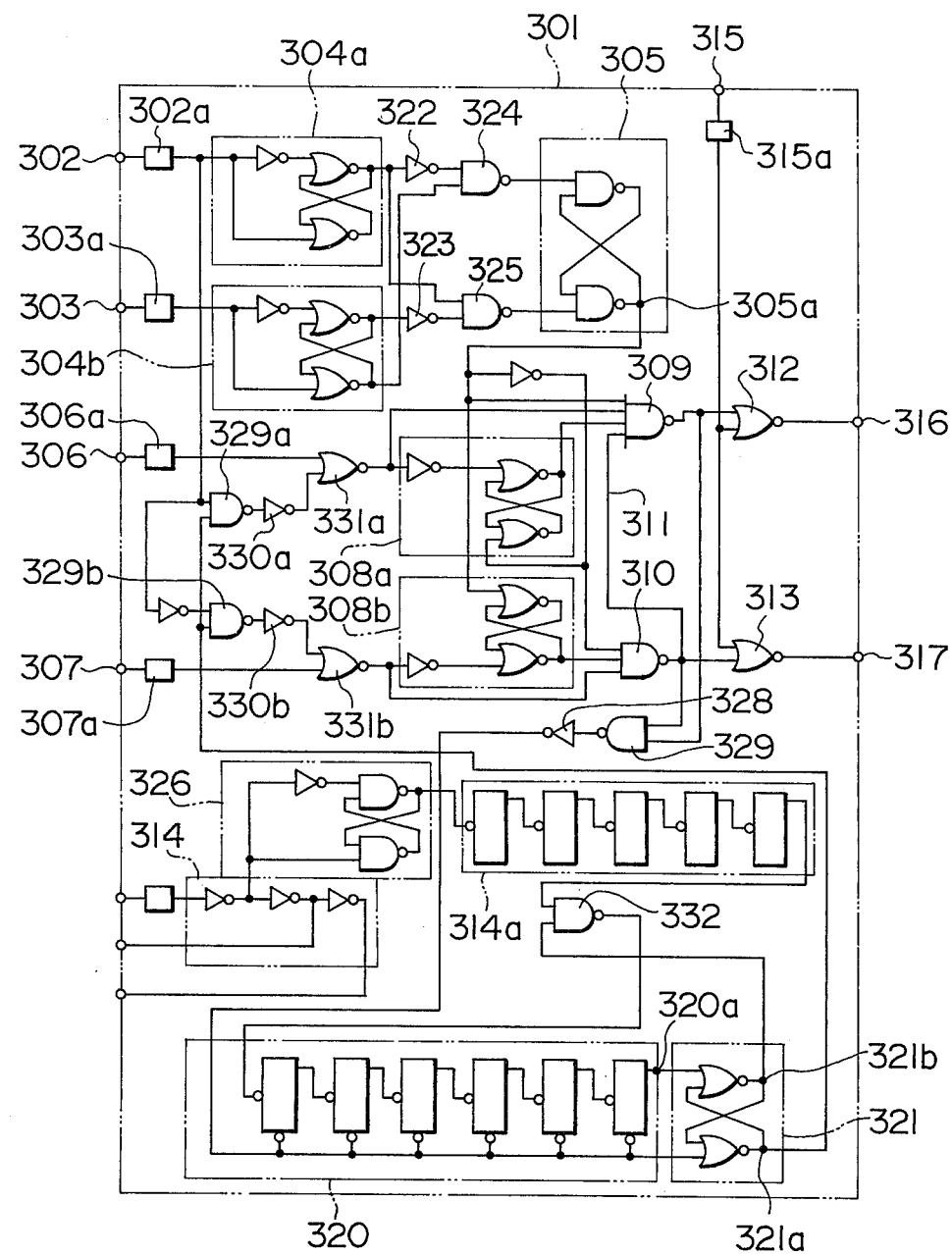
FIG. 3 is a wiring diagram showing the C-MOSIC in control circuit section of FIG. 2.

The C-MOSIC 301 constitutes a computing circuit for the hybrid IC 350 and it has the circuit construction shown in FIG. 3. In operation, the output signals from the door switch 500 and seat switch 400 are respectively supplied through input terminals 302 and 303 and protective circuits 302a and 303a and they are then reshaped respectively by reshaping circuits 304a and 304b each of which includes an inverter and and R-S flip-flop. To accomplish the above-described operations of the seatbelt, a logical circuit is constituted by inverters 322 and 323 and NAND gates 324 and 325. The output signals of the reshaping circuits 304a and 304b are applied to the logical circuit whose output signal is stored in a R-S flip-flop (FF) 305. In other words, the FF 305 is set (a set output terminal 350a goes to a high or "H" level) when the occupant sits in the seat and closes the door, whereas the FF 305 is reset (the output terminal 305a goes to a low or "L" level) when the occupant opens the door to get out of the vehicle. The purpose of this arrangement is to prevent the chattering of the switches 104 and 105 and generate stable motor operating signals. It is necessary to prevent the occurrence of chattering and the like, since the occurrence of the chattering increases the power consumption of the hybrid IC 350 that will be described later and thus increases the temperature of its component elements causing damage to these elements. On the other hand, the output signals from the down limit switch 105 and the up limit switch 104 which stop the movement of the motor 200, are respectively applied to input terminals 306 and 307. The two inputs are supplied respectively through protective circuits 306a and 307a to pulse-like signal processing circuits 308a and 308b. When the supply of current is stopped at a predetermined position to stop the operation of the motor 200, the stopping position varies inevitably due to the effect of inertia and friction and therefore unless the limit switch is provided with any additional mechanism it will be caused to chatter and the generation of resultant pulse-like signals will not be avoided. For this reason, the input signals applied to the input terminals 306 and 307 can be utilized through either of the two processing lines, i.e., the continuous signal processing circuits and the pulse-like signal processing circuits 308a and 308b to prevent the occurrence of the chattering. The signals from the continuous signal processing circuits and the pulse-like signal processing circuits are respectively applied to NAND gates 309 and 310 along with the output signal of the R-S FF 305. When the output of the NAND gate 309 goes to the L level, the motor 200 is rotated in a direction that drives the seatbelt moving piece 101 to the position of the down limit switch 105. When the output of the NAND gate 310 goes to the L level, contrary to the previous case, the piece 101 is moved to the position of the up limit switch 104. When any trouble occurs causing these two different signals to occur simultaneously, the output of the NAND gate 310 is fed back to the NAND gate 309 through a feedback line 311 and priority is given to the movement of the piece 101 to the position of the up limit switch 104. The outputs of the NAND gates 309 and 310 are respectively applied to NOR circuits 312 and 313, and they are also applied to a memory circuit 321 so that when the output remains at the L level in excess of 4 seconds, a timer circuit 320 comes into operation and the output of the NAND gate 309 or 310 is caused to go to the H level to stop the operation of the motor 200 and prevent the occurrence of any trouble.

The above-described operation will be described in greater detail. In FIG. 3, numeral 314 designates an oscillator circuit whose output is reshaped in a reshaping circuit 326 and it is then frequency divided by a frequency dividing circuit 314a. The output of the frequency dividing circuit 314a is applied to the timer circuit 320 which in turn measures the time elapsed after the initiation of the operation of the motor 200. When the motor 200 comes into operation or when the output of either the NAND gate 309 or 310 goes to the L level, the timer circuit 320 is set through a NAND gate 327 and an inverter 328 so that when the motor 200 continues to operate in excess of 4 seconds for some reason or others, an output terminal 320a of the timer circuit 320 goes to the H level and it is applied to the memory circuit 321 causing its output terminal 321a to go to the H level. As a result, if, in this case, the piece 101 is moving toward the down limit swich 105, the output of the NAND gate 309 is caused to go to the H level through a NAND 329a, an inverter 330a and a NOR gate 331a and the motor 200 is thus stopped operating. On the contrary, if the piece 101 is moving toward the up limit switch 104, the output of the NAND gate 310 is caused to go to the H level through a NAND gate 329b, an inverter 330b and a NOR gate 331b to stop the motor 200 operating. The oscillation frequency of the oscillator circuit 314 is increased and its CR constant is reduced through the use of the frequency dividing circuit 314a. The time limit of 4 seconds provided by the timer circuit 320 is obtainable when the oscillation frequency of the oscillator circuit 314 is 256 Hz, and this value may be varied by changing the number of frequency dividing stages in the frequency dividing circuit 314a. When the output terminal 321a of the memory circuit 320 goes to the H level, in order to allow the memory circuit 320 to retain its memory content at that time, a NAND gate 332 is closed by a L level signal from an output terminal 321b of the memory circuit 321 to stop the supply of the output signals of the frequency dividing circuit 314a to the timer circuit 320.

The NAND gates 309 and 310 are connected respectively to output terminals 316 and 317 through their NOR gates 312 and 313 so that when either one of the output terminals 316 and 317 goes to the H level, current is supplied to the motor 200. This operation will become apparent from the following description of the hybrid IC 350.

Figure 4:
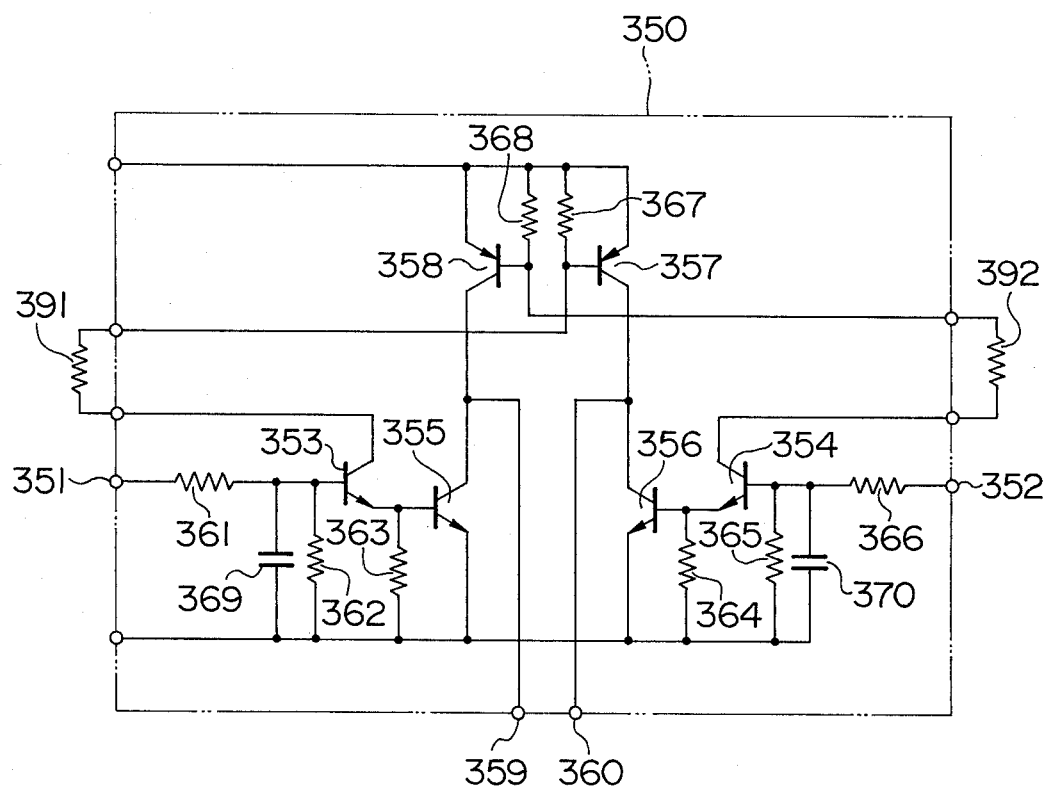
FIG. 4 is a wiring diagram of a hibrid IC used in the control circuit section of FIG. 2.
Figure 5:
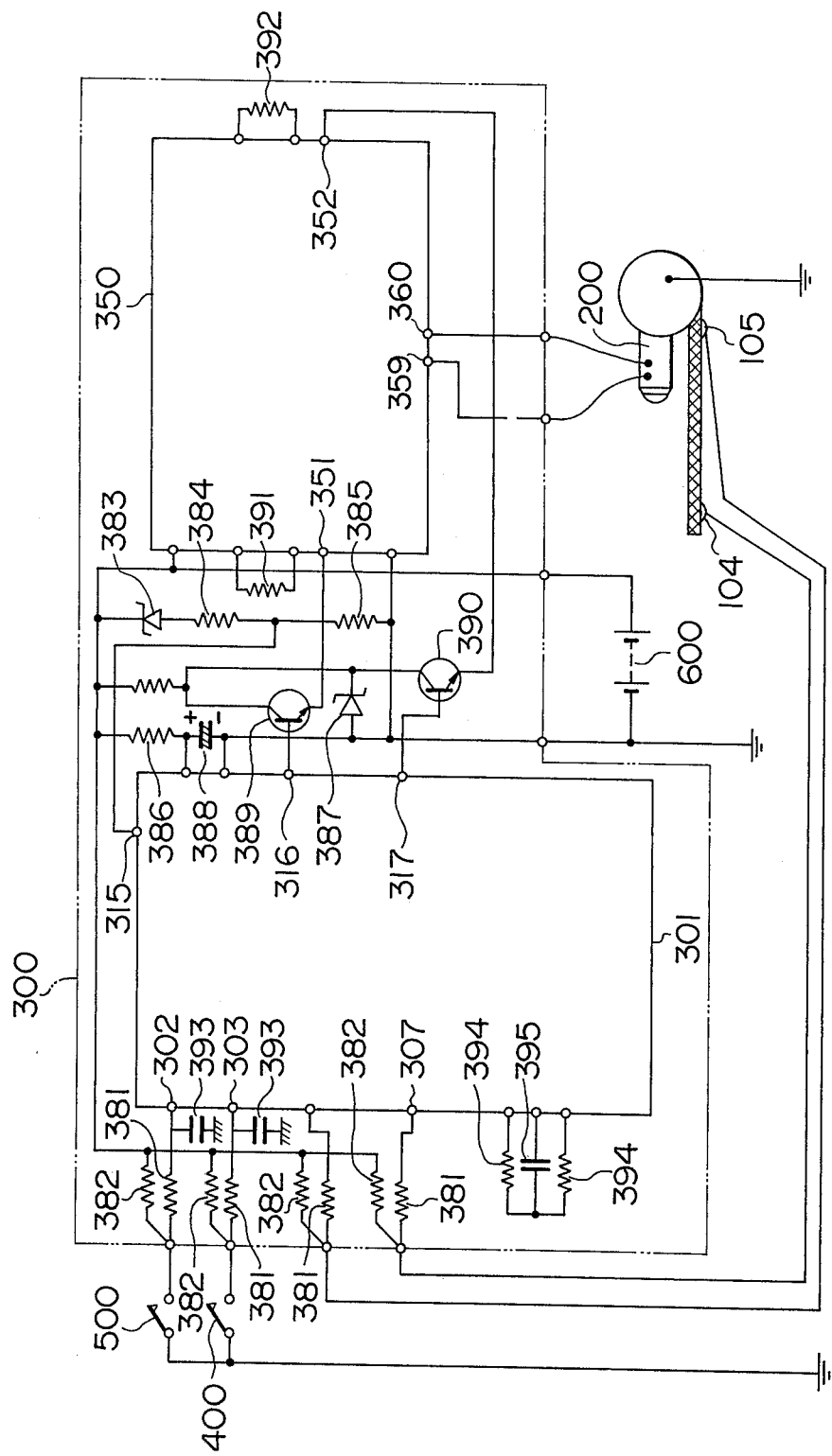
FIG. 5 is a wiring diagram of the entire control circuit section of FIG. 2.

The hybrid IC 350 constituting a motor driving circuit is constructed as shown in FIG. 4 and it consists of motor driving current supplying chips of bipolar structure which are assembled by a hibrid IC technique. Since the outputs delivered from the output terminals 316 and 317 of the C-MOSIC 301 supplies only a small current, as shown in FIG. 5, they are subjected to the emitter follower action by transistors 389 and 390 and they are then applied respectively to input terminals 351 and 352 of the hybrid IC 350. The hybird IC 350 comprises transistors which are arranged in a complementary configuration and the respective diagonal transistors are turned on to change the direction of the current supplied to the motor 200 to rotate it in a forward or reverse direction. In other words, when the signal is applied to the input terminal 351, a transistor 353 is turned on and hence an NPN transistor 355 and a PNP transistor 357 are turned on. Consequently, of these output terminals 359 and 360 which are connected to the motor 200, the output terminal 359 is grounded and the output terminal 360 has a positive potential. In the illustrated embodiment, the signal is applied to the input terminal 351 when the output terminal 316 of the C-MOSIC 301 goes to the H level and hence the motor 200 is rotated in a dirction that drives the piece 101 toward the down limit switch 105. When the signal is applied to the input terminal 352 of the hybrid IC 350, then a transistor 354 is turned on and hence on NPN transistor 356 and a PNP transistor 358 are turned on. Consequently, the output terminal 359 is raised to a positive potential and the output terminal 360 is grounded to rotate the motor 200 in a direction opposite to that of the previously mentioned case. Numerals 361 through 368 designate resistors, 369 and 370 capacitors. Transistor driving base current supply resistors 391 and 392 are provided to the outside of the hibrid IC 350 in consideration of their heat generation. The circuit is constructed in a Darlington configuration to minimize the voltage drop.

FIG. 5 illustrates the component element group 380 for the entire control circuit section 300. The input circuits for the door switch 500 and the seat switch 400 are respectively protected against chattering by a RC delay circuit comprising a resistor 381 and a capacitor 393, and resistors 382 are C-MOSIC input processing resistors and they supply respectively current to the switches 500, 400, 104 and 105. A terminal 315 of the C-MOSIC 301 is designed so that when the supply voltage is raised higher than a predetermined value by a Zener diode 383, a resistor 384 and an input processing resistor 385, a H level signal is supplied to the NOR gates 312 and 313 to cause the outputs of the NOR gates 312 and 313 to go to the L level to terminate the signal for driving the motor 200 which is supplied from the C-MOSIC 301 to the hibrid 350. Numeral 315a designates a protective circuit. The oscillation frequency of the oscillator circuit 314 is varied by means of two resistors 394 and a capacitor 395, i.e., by adjusting the capacitance of the capacitor 395. The supply of power to the hibrid circuit 350 is accomplished by a resistor 386 and a Zener diode 387. Numeral 388 designates a power supply filtering capacitor.

What is claimed is:
1. In a passive seatbelt system of the type which is driven by an electric motor, said passive seatbelt system comprising:
command switch means for detecting the presence of an occupant and generating either a seatbelt activation signal or a seatbelt deactivation signal in accordance therewith;
switch means for detecting the position of said seatbelt; and
a control circuit including a driving circuit for supplying a motor driving current to rotate said motor either in a forward direction or in a reverse direction and a computing circuit connected to both said switch means to control the operation of said driving circuit in accordance with the output signals from both said switch means,
said computing circuit including circuit means whereby when the flow of current to said motor continues in excess of a predetermined time, the signal applied to said driving circuit is terminated to stop the operation thereof to turn off the supply of current to said motor.
2. A system according to claim 1, wherein said computing circuit includes pulse-like signal processing circuit means for preventing chattering of said switch means for detecting the position of said seatbelt.
3. A system according to claim 1, wherein said computing circuit includes circuit means whereby when the supply voltage for said motor exceeds a predetermined value, the signal applied to said driving circuit is terminated to stop the operation of said driving circuit to terminate the supply of current to said motor.
4. A system according to claim 1, wherein said driving circuit comprises four tansistors connected in a bridge configuration, wherein a power supply is connected to the junction point between one pair of opposite angles and said motor is connected to the junction point between the other pair of opposite angles, and wherein either one pair of said transistors on the opposed opposite sides or the other pair of said transisitors on the other opposed opposite sides is energized to rotate said motor either in the forward direction or in the reverse direction.
5. In a passive seatbelt system of the type which is driven by an electric motor, said passive seatbelt system comprising:
command switch means for detecting the presence of an occupant and generating either a seatbelt activation signal or a seatbelt deactivation signal;
switch means for detecting the position of said seatbelt; and
a control circuit including a driving circuit for supplying a motor driving current to rotate said motor either in a forward direction or in a reverse direction and a computing circuit connected to both said switch means to control the operation of said driving circuit in accordance with the output signals from said switch means.
said computing circuit including circuit means whereby when a first signal for causing said driving circuit to operate said motor in the forward direction and a second signal for causing said driving circuit to operate said motor in the reverse direction are generated simultaneously, one of said first and second signals is fed back to the other of said signals to give priority to said one of said signals.

6. In a passive system of the type which is driven by an electric motor, said passive seatbelt system comprising:
command switch means for detecting the presence of an occupant and generating either a seatbelt activation signal or a seatbelt deactivation signal;
switch means for detecting the position of said seatbelt; and
a control circuit including a driving circuit for supplying a motor driving current to rotate said motor either in a forward direction or in a reverse direction and a computing circuit conected to both said switch means to control the operation of said driving circuit in accordance with the output signals from said switch means, said computing circuit includes circuit means whereby when the flow of current to said motor continues to excess of a predetermined time, the signal applied to said driving circuit is terminated to stop the operation thereof to turn off the supply of current to said motor and whereby when a first signal for causing said driving circuit to operate said motor in the forward direction and a second signal for causing said driving circuit to operate said motor in the reverse direction are generated simultaneously, either one of said first and second signals is fed back to the other of said signals to give priority to either one of said signals, and pulse-like signal processing circuit means for preventing chattering of said switch means for detecting the position of said seatbelt.

* * * * *